United States Patent [19]

Eguchi

[11] Patent Number: 4,554,879
[45] Date of Patent: Nov. 26, 1985

[54] ELECTRONIC SEWING MACHINE

[75] Inventor: Yasukata Eguchi, Tokyo, Japan

[73] Assignee: Janome Sewing Machine Industry Co. Ltd., Tokyo, Japan

[21] Appl. No.: 602,328

[22] Filed: Apr. 20, 1984

[30] Foreign Application Priority Data

Apr. 22, 1983 [JP] Japan ............................. 58-70003

[51] Int. Cl.$^4$ ..................... D05B 3/02; D05B 35/12
[52] U.S. Cl. ................................ 112/445; 112/458; 112/277
[58] Field of Search ............... 112/158 E, 158 F, 277, 112/275, 121.11, 121.12, 444, 445, 453, 458

[56] References Cited

U.S. PATENT DOCUMENTS

| | | |
|---|---|---|
| 4,141,305 | 2/1979 | Takenoya et al. |
| 4,256,047 | 3/1981 | Suzuki et al. ............... 112/158 F X |
| 4,323,022 | 4/1982 | Hanyu et al. .................... 112/158 E |
| 4,343,248 | 8/1982 | Hanyu et al. |
| 4,372,231 | 2/1983 | Odermann et al. ............. 112/277 X |
| 4,480,561 | 11/1984 | Makabe et al. ............. 112/158 F X |

Primary Examiner—Peter Nerbun
Attorney, Agent, or Firm—Frishauf, Holtz, Goodman & Woodward

[57] ABSTRACT

A control circuit is provided in an electronic sewing machine wherein a specific stitch pattern is selected from a plurality of stitch patterns stored in an electronic memory, by selection of a corresponding pattern number which is then indicated at a digital indicator arranged on a front panel of the machine housing. A possible incomplete or incorrect selection of a pattern number will cause the selected pattern number indicated at the digital indicator to blink, thus giving a cautionary notice to the machine operator and, at the same time, will cause the sewing machine to stop from further stitching operation.

5 Claims, 2 Drawing Figures

ELECTRONIC SEWING MACHINE

BACKGROUND OF THE INVENTION

This invention relates to an electronic sewing machine having an electronic memory for storing a plurality of stitch patterns which patterns may be selectively read out by manipulating ten-key switches to select a corresponding pattern number. The machine is capable of reminding the operator of a possible incomplete or incorrect manipulation of the ten-key switches.

When a specific pattern, of those stored in the electronic memory of the sewing machine is selected the selected pattern number is indicated on a machine housing, generally on a front panel. It may, however, happen that the operator fails to select a number having a reference to the corresponding stitch pattern. Until now, such an error could not be recognized until the sewing machine was started for actual stitching operation.

SUMMARY OF THE INVENTION

The present invention aims to avoid the inconveniences of the prior art which have often been found in the operation of electronic sewing machines.

Therefore it is an object of the invention to provide an electronic sewing machine capable of indicating to the operator the possible imcomplete or incorrect selection of a pattern number by manipulation of ten-key switches.

According to the invention, there is provided an electronic sewing machine comprising, in combination, an electronic memory for storing stitch control data for a plurality of stitch patterns which may be selectively and sequentially read out to control the formation of a selected pattern by the sewing machine; means for selecting a stitch pattern by designation of a corresponding pattern number; a digital indicator for indicating the pattern number selected by the selecting means; means for detecting if the selected stitch number has a reference to a corresponding specific stitch pattern and for producing an affirmative or negative signal according to the detection; stitch control means responsive to the affirmative signal for controlling needle lateral amplitude and fabric feed amount in accordance with the selected pattern; and means operated in response to the negative signal from the detecting means to cause the digital indicator to make a cautionary operation and to cause the stitch control unit to remain inoperative.

BRIEF DESCRIPTION OF DRAWING

The other objects and advantages of the invention can be fully understood from the following detailed description when read in conjunction with the accompanying drawing in which.

PREFERRED EMBODIMENT OF THE INVENTION

Figure 1:
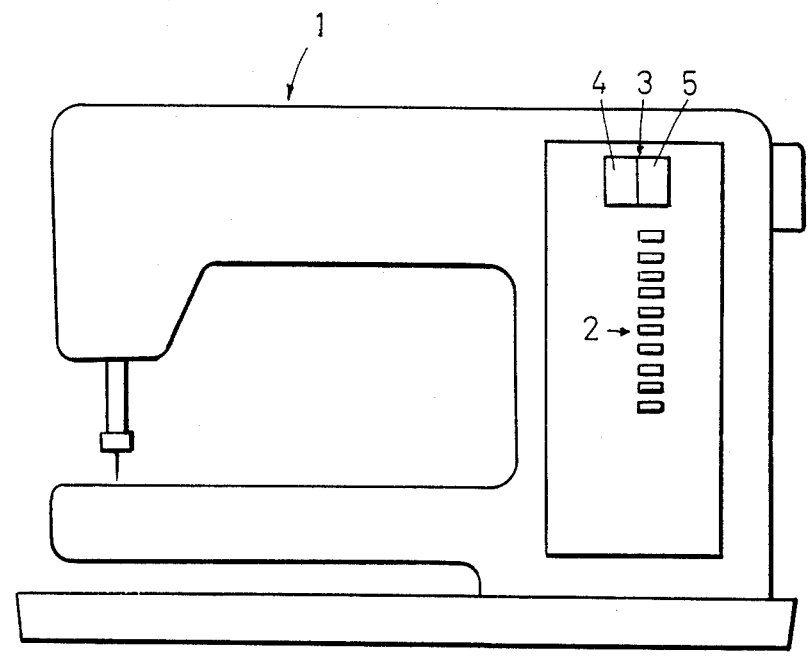
FIG. 1 is a front view showing an electronic sewing machine of the invention.

Now referring specifically to FIG. 1, on a front panel of a housing 1 of an electronic sewing machine, are arranged a series of ten-key switches 2 which are selectively operated to select a two-digit pattern number corresponding to a desired one of a plurality of stitch patterns stored in an electronic memory (not shown). The selected two-digit number is indicated at a number indicator 3 by means of light emitting diodes, which are arranged into a tens digit indicating part 4 and a ones digit indicating part 5.

Figure 2:
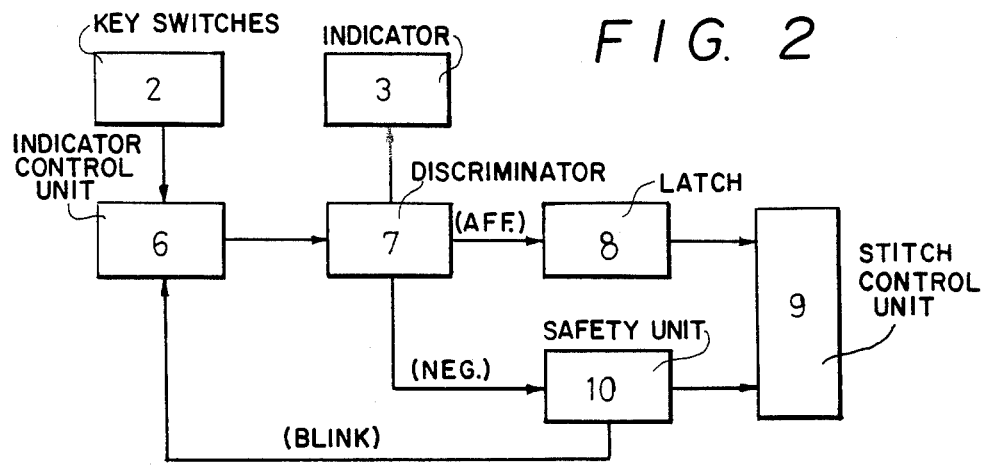
FIG. 2 is a diagram of a control circuit according to the invention.

FIG. 2 is a block diagram of a control circuit of the invention. More particularly, the indication of the pattern number at the indicator 3 is regulated by an indicator control unit 6. Thus, upon the first touch of the ten-key switches 2 the control unit 6 is operated to latch the tens digit of a two-digit number to show the digit in the part 4, while showing a space bar in the ones digit indicating part 5. The next operation of the ten-key switches 2 will operate the control unit 6 to latch the ones digit of the two-digit number to replace the space bar with the ones digit in the part 5. A discriminator 7 is actuated, when two ten-key switches 2 are manipulated to determine if a complete two-digit number corresponding to a specific pattern is selected, and produces an affirmative or negative signal. A latch circuit 8 is operated in response to the affirmative signal to latch the selected pattern number if the selected two-digit number corresponds to a specific stitch pattern, and transmits the latch signal to a stitch control unit 9 for automatically controlling the needle lateral amplitude and the fabric feed amount for the specific stitch pattern. On the contrary, when the selected pattern number has no reference to a stored pattern, the discriminator 7 produces the negative signal. A safety unit 10 is operated in response to the negative signal to produce a signal to the stitch control unit 9 to prohibit the same from operation. The safety unit 10 simultaneously gives another signal to the indicator control unit 6 to cause the selected number of two figures to blink in the indicator 3.

Now it is assumed that the sewing machine operator desires to select a pattern number 78, for example. The operator will at first manipulate the seven key of the ten-key switches 2 to designate 7 as the tens digit of the desired number, and the tens digit 7 is indicated in the part 4 of the indicator 3. At this time, the other part 5 indicates a space bar which continues to blink calling the operator's attention to operate yet another key of the ten-key switches 2 to complete the selected pattern number. Thus, a further touch of the eight key of the ten-key switches 2 will complete the selection and indication of the selected pattern number 78 at the indicator 3.

When there exists a specific stitch pattern to be designated by the selected number 78, the discriminator 7 will produce an affirmative signal. The latch circuit 8 is operated in response to the affirmative signal to latch the selected pattern number, and produces a latch signal to the stitch control unit 9 so that the sewing machine becomes ready for stitching the specific stitch pattern 78 as desired. When there exists no such pattern which is designated by the number 78, the discriminator 7 produces a negative signal to the safety unit 10 which will then produce a signal to prevent the stitch control unit 9 from operation. At the same time, the safety unit 10 produces a signal to the indicator control unit 6 so that the selected number 78 indicated at the indicator 3 is caused to blink, thus reminding the operator that the selected number 78 has no reference to a stitch pattern and must be replaced by a correct pattern number.

While the invention has been described in conjunction with a specific embodiment thereof, it is to be understood that many different modifications and variations may be made without departing from the spirit and scope thereof.

What is claimed is:

1. An electronic sewing machine comprising,
an electronic memory for storing stitch control data for a plurality of stitch patterns to be selectively and sequentially read out, to control the formation of a selected pattern by the sewing machine, each of said plurality of stitch patterns corresponding to a different pattern number to be indicated upon selection of a pattern by an operator;
selecting means for selecting a stitch pattern by designation of a pattern number, said selecting means including a plurality of operating switches;
digital indicator means for indicating said pattern number in the form of two digits when selected by operation of said operating switches of said selecting means;
discriminator means for detecting if said selected pattern number corresponds to a stitch pattern the control data for which is stored in said electronic memory, and for producing either an affirmative or a negative signal according to the detection result;
stitch control means coupled to said discriminator means and responsive to said affirmative signal, for controlling needle lateral amplitude and fabric feed amount in accordance with the selected pattern; and
safety means coupled to said discriminator means, said digital indicator means and said stitch control means, and responsive to said negative signal to cause said digital indicator means to make a cautionary operation, and to cause said stitch control means to remain inoperative.

2. An electronic sewing machine according to claim 1, wherein said safety means is arranged to cause the pattern number indicated by said digital indicator means to blink in response to the negative signal from said discriminator means.

3. An electronic sewing machine according to claim 1, wherein said selecting means includes 10 operating switches.

4. An electronic sewing machine according to claim 1, wherein said selecting means is arranged so that two of said operating switches must be operated successively for selection of a pattern number.

5. An electronic sewing machine according to claim 4, wherein said selecting means is arranged so that after a first operation of one of said operating switches, a corresponding digit is displayed at one part of said indicator means, and a space bar is caused to be displayed and blinked at another part of said indicator means until a second operation of one of said operating switches.

* * * * *